(12) United States Patent
Wilson et al.

(10) Patent No.: US 10,074,219 B2
(45) Date of Patent: Sep. 11, 2018

(54) TOLL PAYMENT EQUIPMENT

(71) Applicant: Allstate Insurance Company, Northbrook, IL (US)

(72) Inventors: Thomas J. Wilson, Chicago, IL (US); Edward A. Biemer, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 532 days.

(21) Appl. No.: 14/573,945

(22) Filed: Dec. 17, 2014

(65) Prior Publication Data
US 2016/0180604 A1    Jun. 23, 2016

(51) Int. Cl.
*G06Q 40/08* (2012.01)
*G07B 15/06* (2011.01)

(52) U.S. Cl.
CPC .......... *G07B 15/063* (2013.01); *G06Q 40/08* (2013.01); *G06Q 2240/00* (2013.01)

(58) Field of Classification Search
CPC ..................................................... G06Q 40/08
USPC ............................................................. 705/4
See application file for complete search history.

(56) References Cited

U.S. PATENT DOCUMENTS

| 5,310,999 | A | 5/1994 | Claus et al. |
| 5,857,152 | A | 1/1999 | Everett |
| 5,991,749 | A | 11/1999 | Morrill, Jr. |
| 6,653,946 | B1 | 11/2003 | Hassett |
| 6,661,352 | B2 | 12/2003 | Tiernay et al. |
| 7,106,212 | B2 | 9/2006 | Konishi et al. |
| 7,707,113 | B1 | 4/2010 | DiMartino et al. |
| 8,587,454 | B1* | 11/2013 | Dearworth ........... G07B 15/063 340/5.1 |
| 8,634,804 | B2 | 1/2014 | McNamara et al. |
| 8,768,755 | B2 | 7/2014 | Hedley |
| 2004/0230480 | A1 | 11/2004 | Kanayama |
| 2006/0273922 | A1* | 12/2006 | Bhogal ................. G08G 1/161 340/901 |

(Continued)

OTHER PUBLICATIONS

"Zurich Seguros and Abertis will offer discounts to customers who drive on toll roads", Abertis Autopistas, Jun. 16, 2014.

(Continued)

*Primary Examiner* — Cho Kwong
(74) *Attorney, Agent, or Firm* — Banner & Witcoff, Ltd.

(57) ABSTRACT

Methods, computer-readable media, software, and apparatuses provide a system for making toll payments using toll payment equipment. The system may include a mobile computing device, a toll gateway, and an insurance company computing device. The mobile computing device (e.g., a phone) may be configured to communicate with the toll gateway when a vehicle carrying the mobile computing device passes through the toll gateway. The mobile computing may send a signal to the insurance company computing device to cause the insurance company computing device to pay an appropriate toll or discounted toll (if applicable). The insurance company may maintain an account for a customer from which toll payments are made. In addition, the insurance company computing device may collect information about the vehicle as it passes through the toll gateway. The insurance company computing device may use this information to determine an insurance-related value, such as an insurance premium.

20 Claims, 8 Drawing Sheets

---

800

Hi John Doe                    Edit Settings

TOLL PAYMENT COMPLETE

*A toll in the amount of $4.50 was paid
for the toll on I-95 in Delaware*
You received a $1.50 discount on this toll!

Your vehicle: Black 2005 Ford Mustang
See more driving data collected at toll here Account Balance: $31 ( Add funds )

( View past toll information )    ( Click to view ads )

(56) References Cited

U.S. PATENT DOCUMENTS

| | | | |
|---|---|---|---|
| 2010/0198692 A1* | 8/2010 | Hotta | G01C 21/26 705/14.62 |
| 2011/0112717 A1* | 5/2011 | Resner | G07C 5/008 701/31.4 |
| 2011/0218896 A1 | 9/2011 | Tonnon et al. | |
| 2011/0275346 A1* | 11/2011 | Fraser | G06Q 30/02 455/408 |
| 2012/0197787 A1 | 8/2012 | Grigg et al. | |
| 2012/0232964 A1 | 9/2012 | Brands | |
| 2012/0329433 A1 | 12/2012 | Fogarty | |
| 2013/0311250 A1* | 11/2013 | Hickethier | G06Q 30/0207 705/14.1 |
| 2014/0025444 A1 | 1/2014 | Willis | |
| 2014/0085110 A1 | 3/2014 | Scofield et al. | |
| 2014/0278574 A1* | 9/2014 | Barber | B60W 40/09 705/4 |

OTHER PUBLICATIONS

"Automatic Toll Collection by using mobile phone", http://webcache.googleusercontent.com/search?q=cache:01rNHGFYjLsJ:www.slideshare.net/silent_god/automatic-toll-collection-by-using-mobile-phone+&cd=1&hl=en&ct=clnk, visited Jul. 8, 2014.

Peter Samuel, "Cellphones paying tolls?", http://tollroadsnews.com/news/cellphones-paying-tolls, Jan. 26, 2011, 5 pages.

* cited by examiner

TOLL PAYMENT EQUIPMENT

FIELD OF ART

Aspects of the disclosure generally relate to methods and computer systems, including one or more computers particularly configured and/or executing computer software. More particularly, aspects of this disclosure relate to a system for exchanging communications between a phone and toll gateway to collect information and toll payments.

BACKGROUND

Some roads (or highways, bridges, tunnels, etc.) require payments for their use. Such roads are commonly referred to as "toll roads" or "turnpikes" and such payments are commonly referred to as a "toll." The money accrued from collecting toll payments may be used to maintain the road for which the toll was collected. The toll charged may be based on an amount of distance a vehicle travels on the road, the time of day that a vehicle travels on the road, and the type of vehicle that is traveling on the road (e.g., vehicles with different numbers of axels may be required to pay different tolls). If payment is not made when a vehicle passes a toll, a driver or the vehicle's owner may be issued a ticket or citation for using the road without paying the toll. The fee associated with such ticket may often be for more than the toll payment that was due.

Historically, people have been employed to collect tolls at certain points along a road. For example, a person may be stationed in a toll booth at the entrance or exit of a highway to collect the toll payment as a vehicle enters or exits the highway, respectively. Getting through such checkpoints may be frustrating for drivers. For example, drivers may be frustrated with the lines or traffic that may be formed as a result of the time it takes to make toll payments. Drivers may also become frustrated if they do not have the exact change or enough money on hand to pay for the toll.

To address some of these frustrations, more recently technology has been developed to improve the toll payment process. Some companies or organizations (e.g., EZ Pass) offer a service that allows toll payments to be collected automatically so that the vehicles do not have to stop and/or drivers do not need to pay cash for the toll. A company may provide a customer with a transponder that may be placed in the customer's vehicle so that when the vehicle is driven through a toll gateway the transponder is detected. Detection of the transponder may cause an account to be automatically charged for the toll.

This more recent toll payment process may be considered an improvement over the traditional collection process, but is not without disadvantages as well. In some cases, customers may have to pay a fee to acquire the transponder. Also, customers may be charged if they lose the transponder. Further, a customer may have multiple vehicles and may need a transponder in each of their vehicles or may have to remember to move the transponder into their different vehicles. In some cases, customers have been known to forget to put their transponder in their vehicle. Also, customers may not have their transponder with them when they are driving another vehicle, such as a friend's vehicle, a rental car, etc. Moreover, the customer may have to place the transponder on the windshield or at another inconvenient/distracting spot on the vehicle. In some cases the transponder may not work if it is in, for example, a glove compartment of a vehicle.

In addition, customers may have to set up the account from which toll payments are deducted. In some cases, this account may be linked with a customer's bank account so that it is replenished at certain points. Alternatively, a customer may be responsible for manually managing the account and ensuring that the account has enough money in it when the customer's vehicle goes through a toll checkpoint. If the customer fails to have enough money in the account, the customer may receive a ticket or be charged a surcharge fee (or another extra fee).

In light of the above, despite advancements in technology, there are still challenges and disadvantages with respect to the toll payment process. Accordingly, new systems, devices, methodologies, and software are desired to facilitate toll payments.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for making a toll payment using toll payment equipment, such as a cellular phone. A phone travelling in a vehicle may communicate with a toll gateway and a computing device at an insurance company to pay the toll due for driving the vehicle through the toll gateway. The phone may send a signal to an insurance company computing device to cause the insurance company computing device to pay an appropriate toll. In some cases, the insurance company may give a customer a discount on the toll. The insurance company may maintain an account for a customer from which toll payments are made. In addition, the insurance company may collect information about the vehicle as it passes through the toll gateway. The insurance company may use this information to determine an insurance-related value, such as an insurance premium.

Aspects of this disclosure provide a system including a first computing device associated with a first vehicle, wherein the first computing device is configured to send and receive cellular phone calls. The system may also include a toll gateway configured to detect the first vehicle if the first vehicle passes through the toll gateway and communicate with the first computing device. The system may further include an insurance company computing device (which may be a computing device owned or maintained by or for an insurance company) configured to transfer funds from an account associated with the first computing device in response to receiving, from the first computing device or the toll gateway, a signal indicating that the first vehicle passed through the toll gateway. The insurance company computing device may also be configured to receive, from the first computing device or the toll gateway, drive data of the first vehicle while the first vehicle passed through the toll gateway and to determine an insurance related value based on the drive data.

Aspects of the disclosure also provide the computing devices of the system as well as the computer readable media of those computing devices that store one or more toll equipment programs. Specifically, aspects of the disclosure provide a computing device, including a network interface configured to communicate, via a network, with a mobile computing device and a toll gateway, wherein the mobile computing device is configured for use in cellular phone calls and wherein the toll gateway is configured to detect a vehicle if the vehicle passes through the toll gateway. The computing device may also include at least one processor configured to execute computer-executable instructions stored on computer readable media. The at least one processor may be configured to receive, from the mobile computing device or the toll gateway via the network interface, a signal indicating that the vehicle passed through the toll gateway. The at least one processor may also be configured to, in response to receiving the signal, transmit an electronic payment for a toll associated with the toll gateway. Further, the at least one processor may be configured to receive drive data of the vehicle while the vehicle passed through the toll gateway, and determine an insurance related value (e.g., an insurance premium, an insurance deductible, or a drive score used in determining the insurance premium or the insurance deductible) based on the drive data. In some examples, the processor may access, read, and write data to a particular memory device. The memory device may store computer-executable instructions of one or more toll equipment programs.

Aspects of the disclosure further provide a method of making toll payments using a mobile computing device (e.g., a phone). The method may include receiving, by a mobile computing device configured for use in cellular phone calls, a beacon signal as the mobile computing device within a vehicle passes through a toll gateway; transmitting, to an insurance company computing device via a cellular backhaul, a signal indicating that the vehicle has passed through the toll gateway; in response to receiving the signal, determining an account associated with the mobile computing device; transferring funds from the account to pay a toll associated with the toll gateway; receiving, from the mobile computing device or the toll gateway, drive data of the vehicle while the vehicle passed through the toll gateway; and determining an insurance related value based on the drive data.

Of course, the methods, devices, and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
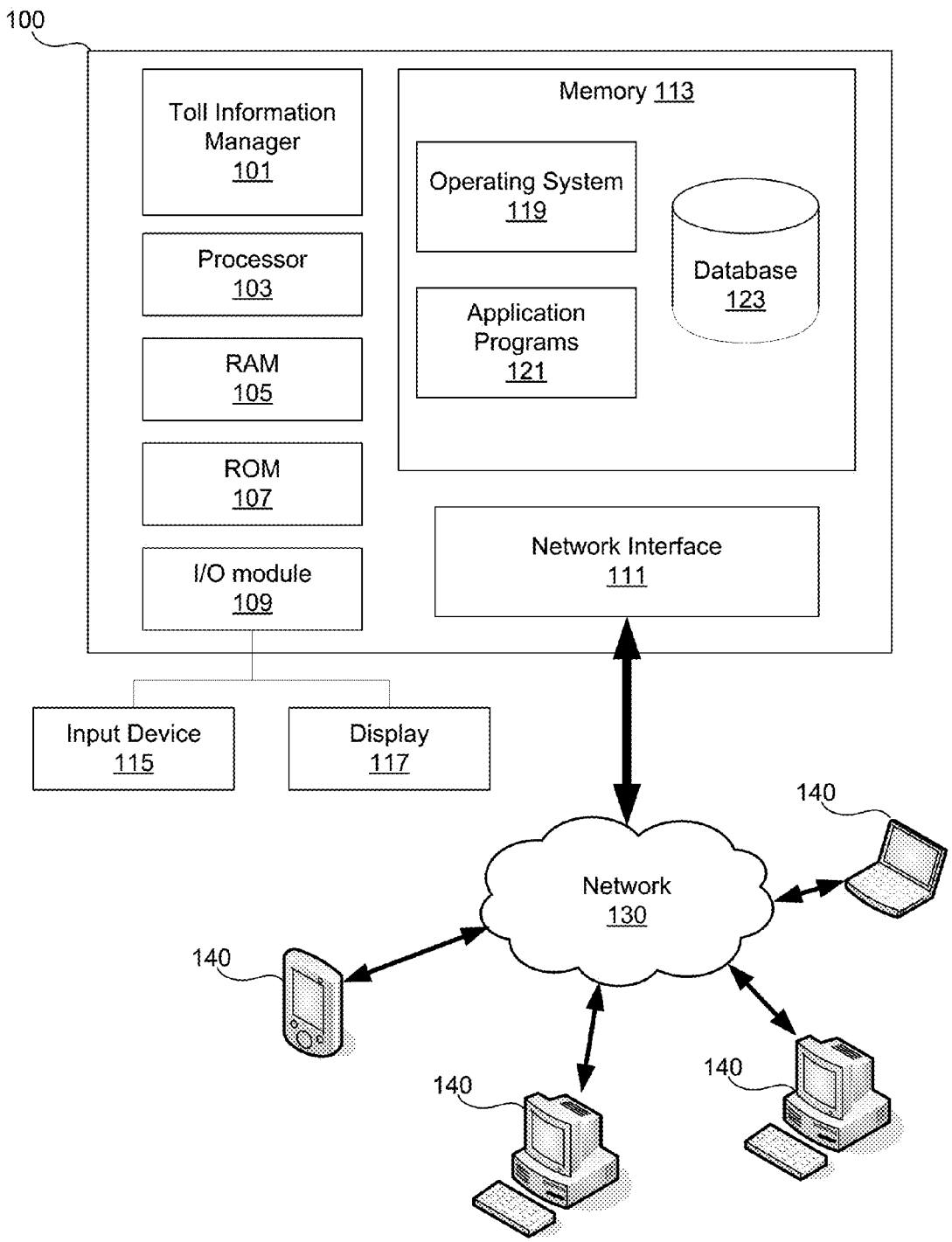
FIG. 1 is a block diagram of an example computing device that may be used according to an illustrative embodiment of the present disclosure.

In accordance with various aspects of the disclosure, methods, computer-readable media, software, and apparatuses are disclosed that provide a system for making toll payments using toll payment equipment, such as a phone. The toll payment system may allow users to use their cell phones to pay tolls. A user may drive through a toll gateway without stopping and her phone may communicate with the toll gateway to satisfy payment of the toll. The toll gateway and/or phone may communicate with a backend system that may transfer the funds for the toll. Information captured as the user passes through the toll gateway may be used to provide discounts on the toll or other insurance related payments (e.g., insurance premiums or insurance deductibles).

The toll payment system may include a cell phone (traveling in a vehicle) that assists in paying a toll when a car passes through a toll gateway. The toll gateway may send a signal to the cell phone when the cell phone is in proximity to the toll gateway. The cell phone may receive the signal and send another signal to a computer or server that automatically transfers the dollar amount of the toll from a pre-established toll account to the toll company. The cell phone may also send a response signal to the toll gateway indicating that the signal from the gateway was received and/or that the pre-established toll account is operating properly (e.g., that the toll payment has been made or will be made). If the toll gateway does not receive the proper return signal from the cell phone, the toll gateway may use a camera to take one or more photographs of the vehicle. In particular, the camera may be operated to take a photograph of the license plate of the vehicle for future processing and issuance of a ticket. The cell phone may further provide an indication, such as an audible tone, that can be heard by the driver of the car when the toll payment is completed (e.g., when the response signal is sent to the toll gateway).

Further, information may be sent to an insurance company regarding payment of the toll. This information may include the time and location of the payment, the speed of the phone during the payment, and/or the proximity of the phone to other phones at the time of payment. In some embodiments, an insurance company may use this information as rating factors in setting insurance premiums for the customer. The insurance company may provide the customer with a discount on the toll payment in exchange for allowing use of the customer data or in exchange for the customer receiving audio or visual advertisements after the toll payment. The insurance company may also manage the pre-established toll account in some examples.

The toll payment system may allow for situations where several cell phones are in the same car. In such a situation, the phones may communicate with each other and determine which of the phones is the dominant phone responsible for communicating with the toll gateway. After this determination, only the dominant phone may communicate with the toll gateway. The determination of the dominant phone can be based on preferences set by the users of the phones or based on the location of the phones within the vehicle. The relation of the phones within the vehicle may be determined by determining the location of the phones in relation to an on-board diagnostic port (e.g., the OBD II port) of the vehicle.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a toll information manager 101 for performing methods and executing instructions of the one or more toll equipment programs described herein. The toll information manager 101 may be implemented with one or more processors and one or more storage units (e.g., databases, RAM, ROM, and other computer-readable media), one or more application specific integrated circuits (ASICs), and/or other hardware components. Throughout this disclosure, the toll information manager 101 may refer to the software and/or hardware used to implement the toll information manager 101. The one or more processors of the toll information manager 101 may operate in addition to or in conjunction with another general processor 103 of the computing device 100. Both the toll information manager 101 and the processor 103 may be capable of controlling operations of the computing device 100 and its associated components, including RAM 105, ROM 107, an input/output (I/O) module 109, a network interface 111, and memory 113.

The I/O module 109 may be configured to connect to an input device 115, such as a microphone, keypad, keyboard, touchscreen, and/or stylus through which a user of the computing device 100 may provide input data. The I/O module 109 may also be configured to connect to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the toll equipment program(s), such as rules for making toll payments, rules for collecting information, rules for handling communications between toll gateways, phones, and backend computing devices. On some computing devices 100, the input device 115 may be operated by users (e.g., customers) to interact with the toll equipment program, including providing user information and/or preferences, providing vehicle information (e.g., make and model of a vehicle), reviewing toll payments, viewing advertisements, reviewing driving behavior data, etc., as described herein. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet, a cellular network, or satellite network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the processor 103 in addition to one or more processors of the toll information manager 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, speedometer, odometer, etc.).

Figure 2:
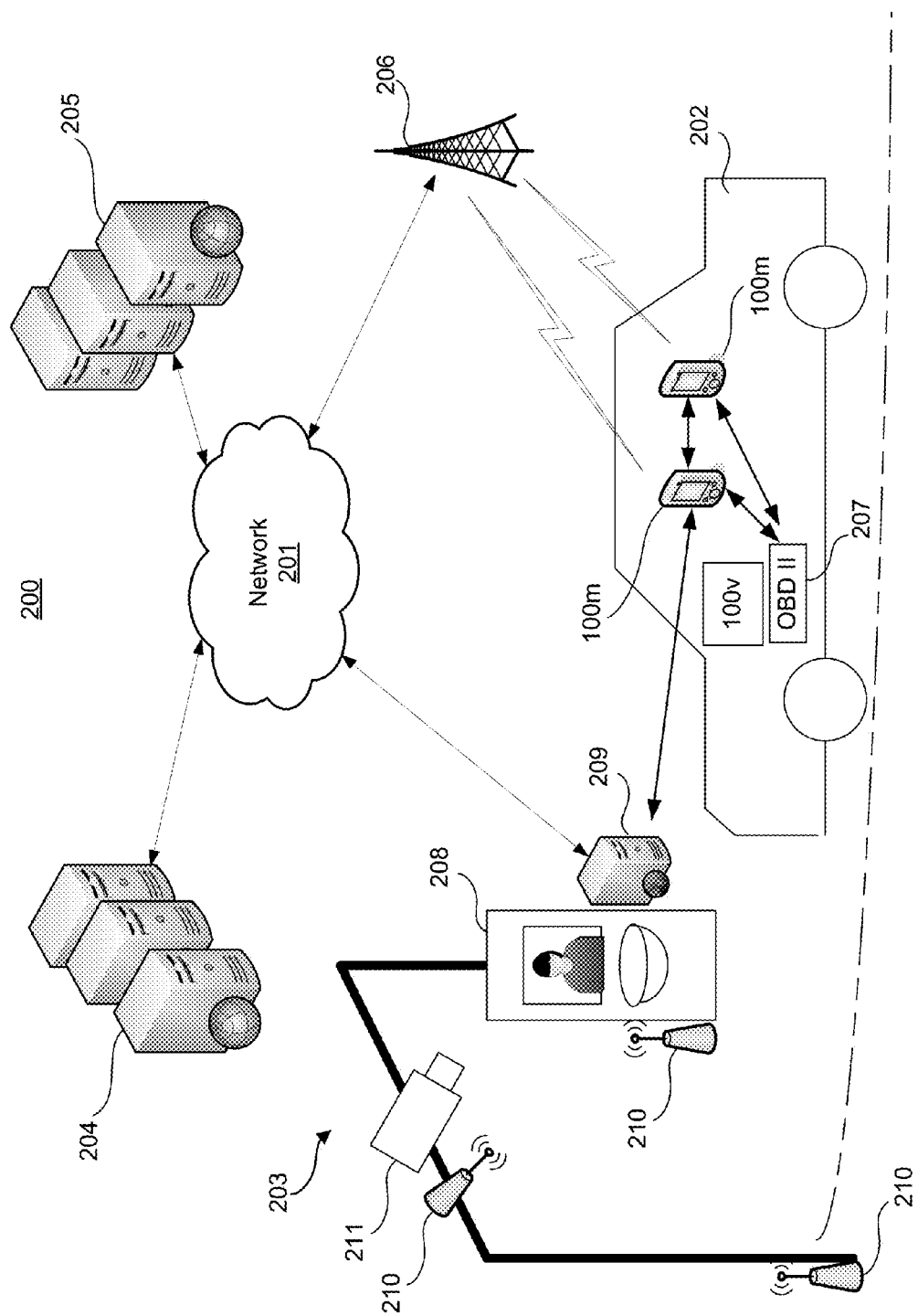
FIG. 2 illustrates an example network environment in which a system in accordance with the present disclosure may be implemented.

The methods and software for facilitating toll payments as disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices within or associated with one or more vehicles 202, computing devices of the toll gateway 203, one or more toll management computing devices 204, and one or more insurance company computing devices 205. Collectively, these computing devices may form a toll payment system. The network 201 may be any type of network, like the network 130 described above, and use one or more communication protocols (e.g., protocols for the Internet (IP), Bluetooth, cellular communications, satellite communications, etc.) to connect computing devices and servers within the network environment 200 so they may send and receive communications between each other. In particular, the network 201 may include a cellular network and its components, such as cell towers 206. Accordingly, for example, a mobile computing device 100*m* (e.g., a smartphone) of a person in vehicle 202 may communicate, via a cell tower 206 of a cellular backhaul of the network 201, with an insurance company computing device 205 to cause the insurance company computing device 205 to transfer an electronic payment to the toll management computing device 204. While FIG. 2 illustrates that the mobile computing devices 100m are within the vehicle 202, it should be understood that these same mobile computing devices 100m may connect to the network 201 even if they are removed from the vehicle 202.

FIG. 2 illustrates only one vehicle 302. However, the toll payment system may be configured to send and receive communications with multiple vehicles 202 simultaneously so that it may process multiple toll payments simultaneously. Also, although FIG. 2 depicts the vehicle 202 as a car, the vehicle 202 may be any type of vehicle, including a motorcycle, bicycle, scooter, drone (or other automated device), truck, bus, boat, plane, helicopter, etc.

Similarly, although FIG. 2 only shows one toll gateway, it should be understood that the toll payment system may include multiple toll gateways 203 at the same location (e.g., same entrance or exit to a toll road) and/or multiple toll gateways at different locations. Further, the toll payment system may be configured to send and receive communications with multiple toll gateways 203 simultaneously.

FIG. 2 also illustrates an example subsystem within the network environment 200. Specifically, FIG. 2 illustrates an example arrangement of computing devices that may exist within a vehicle 202. As shown in the example of FIG. 2, the vehicle 202 may include two mobile computing devices 100m, a vehicle computing device 100v, and an on board diagnostic connector (OBD II). One mobile computing device 100m may be a smartphone of one person (e.g., a driver), and the other mobile computing device 100m may be a smartphone of another person (e.g., a passenger). In some embodiments, the mobile computing devices 100m may communicate with each other (e.g., via Bluetooth) to determine which mobile computing device will be responsible for assisting in making toll payments. Moreover, one or more of the mobile computing devices 100m may communicate (e.g., via Bluetooth) with the vehicle computing device 100v and/or a device connected to the vehicle's OBD II connector 207. Although FIG. 2 depicts the mobile computing devices 100m as smartphones, the mobile computing devices 100m may be any mobile computing device (e.g., a tablet, personal digital assistant (PDA), smart-watch, satellite phone, etc.). The mobile computing devices 100m may be associated with a driver or passenger of the vehicle 202. The mobile computing device 100m may be configured in a similar manner to the computing device 100 of FIG. 1. Further, the mobile computing device 100m may be configured to execute a client-side toll equipment program that handles communications with toll gateways and backend system computing devices, such as the toll management computing device 204 or insurance company computing device 205 and provides a user interface for a client to provide inputs to and receive outputs from the toll payment system. Such a client-side toll equipment program may be downloaded or otherwise installed onto the mobile computing devices 100m using known methods. Once installed onto the vehicle computing device 100v, a user may launch the client-side toll equipment program by, for example, operating buttons or a touchscreen on the mobile computing device 100m. Additionally, or alternatively, the mobile computing device 100m may be configured to execute a web browser (e.g., an application for accessing and navigating the Internet) to access a web page providing an interface for the toll payment system. In some embodiments, the mobile computing device 100m may also be configured to collect drive data using, e.g., its accelerometer, GPS, gyroscope, etc. Drive data may include vehicle telematics data or any other data related to events occurring during a vehicle's trip (e.g., an impact to a part of the vehicle, a deployed airbag, etc.). Drive data may also include location information, such as GPS coordinates, indicating the geographical location of the mobile computing devices 100m.

Although FIG. 2 depicts two mobile computing devices 100m within the vehicle 202, there may be more or less mobile computing devices 100m in some cases. For example, the vehicle 202 may carry additional passengers, and each person may have one or more mobile computing devices 100m. Or, for example, the people in the customer vehicle 302 might not have a mobile computing device 100m or might have left their mobile computing device 100m elsewhere. Also, if the vehicle is autonomous, there might not be any mobile computing device 100m.

As mentioned above, the vehicle 202 may also include a vehicle computing device 100v. The vehicle computing device 100v may be configured in a similar manner to the computing device 100 of FIG. 1. Further, the vehicle computing device 100v may be configured to execute the client-side toll equipment program that provides a user interface for a customer to provide inputs to and receive outputs from the toll payment system. Such a client-side toll equipment program may be downloaded or otherwise installed onto the vehicle computing device 100v using known methods. Once installed onto the vehicle computing device 100v, a user may launch the client-side toll equipment program by, for example, operating buttons or a touchscreen on the dashboard of the vehicle 202. In some examples, the client-side toll equipment program may be automatically launched whenever the vehicle 202 is started or put in gear. Additionally, or alternatively, the vehicle computing device 100v may be configured to execute a web browser to access a web page providing an interface for the toll payment system. In some embodiments, the vehicle computing device 100v may also be configured to collect drive data using, e.g., its accelerometer, GPS, gyroscope, etc. As mentioned above, this drive data may include vehicle telematics data or any other data related to events occurring during a vehicle's trip (e.g., an impact to a part of the vehicle, a deployed airbag, or other event triggered by a sensor of the vehicle). The vehicle 202 may have a GPS installed therein, and therefore, the vehicle computing device 100v may also collect GPS coordinates.

As mentioned above, the vehicle computing device 100v and/or mobile computing devices 100m may communicate with the vehicle's on-board diagnostic (OBD) system 207, which is typically located beneath the steering wheel of the vehicle 202. In some embodiments, a device may be connected to the OBD II connector of the vehicle 202 to assist in making toll payments. In such an embodiment, the device connected to the OBD II connector may be used instead of a mobile computing device 100m (e.g., a phone). In some embodiments, the OBD system 207 may be used in conjunction with mobile computing devices 100m to obtain data (e.g., from vehicle sensors such as a fuel gauge, tire pressure sensors, engine temperature sensors, etc.) about the vehicle at the time of passing through a toll gateway. Also, in some examples, the OBD system may assist multiple mobile computing devices 100m within the same vehicle 202 in determining which mobile computing device is dominant, and therefore, responsible for making the toll payment.

In some embodiments, one or more vehicles 202 may be autonomous or in an autonomous mode (e.g., auto-pilot mode). An autonomously controlled vehicle 202 may be controlled by its vehicle computing device 100v and/or a remote computing device. The vehicle computing device 100v may employ sensors for inputting information related to the vehicle's surroundings (e.g., distance from nearby objects) and use the inputted information to control components of the vehicle 202 to steer and accelerate/decelerate the vehicle 202.

FIG. 2 also illustrates another subsystem referred to herein as the toll gateway 203. The toll gateway may be configured to detect one or more vehicles 202 as they pass through the toll gateway 203. As shown in FIG. 2, the toll gateway 203 may include a toll booth 208, a toll gateway computing device 209, one or more toll gateway transceivers 210, and a camera. The toll gateway may include additional infrastructure and devices, such as sensors, to detect when vehicles 202 pass through the toll gateway. Although only one toll gateway is shown, it should be understood that a number of toll gateways 203 may be located at the same checkpoint (e.g., entrance to a highway). Also, other toll gateways 203 may be located at other locations, but may still communicate with the toll management computing device 204 and insurance company computing device 205.

Some people might not have a means for automatically making a toll payment (e.g., might not have a smartphone with the client-side toll equipment program installed thereon), and therefore, may have to pay the toll in cash to an attendant working in the toll booth 208 or drop money into a basket on the toll booth 208. However, if the mobile computing device 100m in the vehicle 202 is running the client-side toll equipment program, the vehicle 202 does not have to stop at the toll booth 208 to make the toll payment. Instead, the vehicle 202 may continue moving and the mobile computing device 100m (or another device in the vehicle such as the vehicle computing device 100v) may communicate with the toll gateway computing device 209 and/or toll gateway transceivers 210 as the vehicle 202 moves through the toll gateway 203. The toll gateway computing device 209 may communicate with the toll management computing device 204 or insurance company computing device 205 via the network 201. For example, the toll gateway computing device 209 may communicate with the toll management computing device 204 to confirm that the toll payment was successfully received.

The toll gateway transceivers 210 may transmit a beacon signal that may be detected by any mobile computing device 100m passing through the toll. FIG. 2 shows three toll gateway transceivers 210 for a single toll gateway 203; however, fewer or more toll gateway transceivers 210 may be used for a single toll gateway 203. More than one toll gateway transceiver 210 may be used for each toll gateway 203 in order to improve the coverage area of the beacon signal and ensure that the beacon signal is picked up by any mobile computing device 100m passing through the toll gateway 203. In some embodiments, where multiple toll gateway transceivers 210 are used for a single toll gateway 203, the multiple toll gateway transceivers 210 may transmit beacons signals with the same frequency and/or information. Alternatively, in some embodiments, the multiple toll gateway transceivers 210 may each transmit a beacon signal with a different frequency and/or different information. Further, the beacon signals may be transmitted continuously or intermittently (e.g., periodically). Where there are multiple toll gateway transceivers 210 for a single toll gateway 203, the toll gateway transceivers 210 may transmit the beacon signals at the same time or at different times (e.g., at offset intervals).

The beacon signal transmitted by the toll gateway transceivers 210 may be any radio frequency (RF) signal. Further, the beacon signal may include a variety of information, such as an identifier that identifies the toll gateway 203. The identifier may be unique to the toll gateway 203 at that checkpoint or unique to the toll gateway 203 with respect to all toll gateways 203 in the system. The toll gateway transceivers 210 may be programmable so that the information included in the beacon signals may be updated. In addition to transmitting beacon signals, the toll gateway transceivers 210 may be configured to receive responses from mobile computing devices 100m. For example, the toll gateway transceivers 210 may be configured to receive an RF signal indicating that a mobile computing device 100m received the signal from the toll gateway transceivers 210 and/or indicating that the toll payment was made.

The toll gateway transceivers 210 may also communicate with the toll gateway computing device 209. A communication from the toll gateway transceivers 210 to the toll gateway computing device 209 may inform the toll gateway computing device 209 when a mobile computing device 100m is detected. Further, the toll gateway transceiver 210 may provide information to the toll gateway computing device 209 related to a driving behavior (e.g., speed) of a vehicle 202 as the vehicle 202 passes through the toll gateway 203. Such speed may be determined by determining the speed of a mobile computing device 100m within the vehicle 202 and assuming the speed of the mobile computing device 100m represents the speed of the vehicle 202. Moreover, in some embodiments, a toll gateway transceiver 209 may inform the toll gateway computing device 210 that a mobile computing device 100m passed through the toll, but did not pay the fees.

In such cases where the toll payment is not made, the toll gateway computing device 210 may automatically operate the camera 211. For example, the toll gateway computing device may cause the camera to take a photograph if a vehicle passes a toll gateway 203 and does not pay the toll and/or there are not enough funds in an account associated with the vehicle to cover the toll. In some embodiments, the camera 211 may take be pre-set to take a photograph of every vehicle that passes through the toll gateway 203, and the toll gateway computing device may determine which photographs to store and which ones to delete. For example, the toll gateway computing device 209 may determine to flag a photograph of a particular vehicle that did not pay and store the vehicle in association with information indicating non-payment for later processing of a ticket or citation.

The camera 211 may be any type of camera and may be able to capture video, audio, and/or still photographs. In some embodiments, the camera 211 may have a fixed orientation, while in other embodiments, the camera's orientation may be controlled by the toll computing device 209 or another device. For example, the toll computing device 209 may control the orientation of the camera 211 to take a photograph of a license plate of a vehicle 202. The toll computing device 209 may include software (e.g., pattern recognition software) for discerning the license plate number from the photograph. Then, the toll computing device 209 may store the license plate number identified from the photograph with the image data (e.g., pixel information) for the photograph and other information, such as information indicating that the toll was not paid for the vehicle 202. The camera 211 may also be used to capture other information, such as tailgating information. For example, the camera 211 may take a video or photographs of consecutive vehicles 202 passing through a toll gateway 203 and the toll gateway computing device 209 may use the captured video or photographs to determine whether the second vehicle 202 is tailgating the first vehicle 202. For example, the toll gateway computing device 209 may analyze a video to determine a distance and/or time between two vehicles to determine whether the second vehicle is tailgating the first vehicle. Such tailgating information may be of interest to an insurance company seeking to determine the driving behaviors of their customers for the purpose of determining risk and calculating insurance related information (e.g., insurance premiums, insurance deductibles, etc.). For example, a driver who tailgates another driver through a toll gateway 203 may be deemed to be a riskier driver than a driver who does not tailgate, and therefore, may be a bigger liability to an insurance company than the driver who does not tailgate. In some embodiments, an insurance company may use the tailgating information obtained from the camera 211 at the toll gateway 203 to reward drivers for not tailgating to warn drivers who do tailgate.

FIG. 2 also shows toll management computing devices 204, which may belong to a toll company operating the toll gateway 203. The toll company may be a private or public company or government operated entity. The toll management computing devices 204 may be configured similar to the computing device 100 of FIG. 1. The toll management computing devices 204 may be configured to store records or logs indicating which vehicles passed through the toll gateway 203. The toll management computing devices 204 may also be configured to process money transfers for toll payments. For example, the toll management computing devices 204 may receive an electronic payment for a toll from the insurance company computing devices 205 and update a driver or vehicle account for which the toll was paid. If a toll is not paid, the toll management computing devices 204 may issue tickets or citations (which may include generating ticket numbers and determining a dollar amount of the fine). Further, the toll management computing devices 204 may also handle billing matters and/or generate reports. For example, the toll management computing devices 204 may generate a monthly bill or report for a customer that indicates the tolls owed by the customer for the month. Such a bill may be itemized to inform the customer each time their vehicle passed through a toll gateway and how much was charged. The toll management computing devices 204 may deliver such bills and reports to the appropriate customer via email or other electronic forms of communication.

In addition, FIG. 2 depicts insurance company computing devices 205. The insurance company computing devices 205 may belong to an insurance company that provides insurance (e.g., automotive insurance), or to another company that manages and maintains the insurance company computing devices 205 on behalf of (or for providing a service to) an insurance company. The insurance company computing devices 205 may be configured similar to the computing device 100 of FIG. 1. The insurance company computing devices 205 may be specially configured (e.g., programmed) to communicate with mobile computing devices 100m. In particular, the insurance company computing devices 205 may be configured to receive indications from mobile computing devices 100m when they pass through toll gateways 203. Based on the information received, the insurance company computing devices 205 may determine which toll company should be paid and a dollar amount that should be transferred to the toll company. The insurance company computing devices 205 may manage accounts for their customers from which money is deducted to pay tolls. The accounts may be set up on a per vehicle basis, per driver basis, or per insurance policy basis. For example, a husband and wife may be on the same insurance policy and have one account for paying tolls whenever either one of them pass through a toll gateway 203.

The insurance company computing devices 205 may also transmit information to the mobile computing devices 100m regarding toll payments and other driving behavior information (e.g., information indicating that the driver is speeding through the toll gateway or tailgating). The insurance company computing devices 205 may communicate with the toll gateway computing device 209 or toll management computing devices 204 to receive driving behavior information for their customers while their customers passed through a toll gateway 203. For example, the insurance company computing devices 205 may receive driving behavior information from a toll gateway computing device 209 indicating that a driver insured by the insurance company was tailgating or speeding as they passed through the toll gateway 203.

In some embodiments, the insurance company computing devices 205 may determine insurance related information (e.g., insurance premiums, insurance deductibles, etc.) based on driving behavior information obtained. Additionally, or alternatively, the insurance company computing devices 205 may determine discounts to be applied. Discounts may be earned for simply passing through the toll gateway 203 or for driving well (e.g., not speeding) through the toll gateway 203. The insurance company computing devices 205 may also determine when, how many, and/or which advertisements are to be sent to a customer after they pass through a toll gateway 203. In some embodiments, a customer may avoid paying for a toll with money in exchange for receiving and/or viewing advertisements.

Although the insurance company computing devices 205 are shown as separate from the toll management computing devices 204 in FIG. 2, in some embodiments the insurance company may manage the toll gateways 203 and therefore the insurance company computing devices 205 may be the same as (or merged with or located in the same place as) the toll management computing devices 204. It should also be understood, that the insurance company computing devices 205 may include various computing devices used by an insurance company for various insurance related services. For example, the insurance company computing devices 205 may include computing devices for tracking insurance claims, managing insurance policy information, etc. In some embodiments, one or more of the insurance company computing devices 205 may be configured to host a website for the insurance company through which customers may view and update information on their insurance (e.g., automotive insurance) policy.

Figure 3:
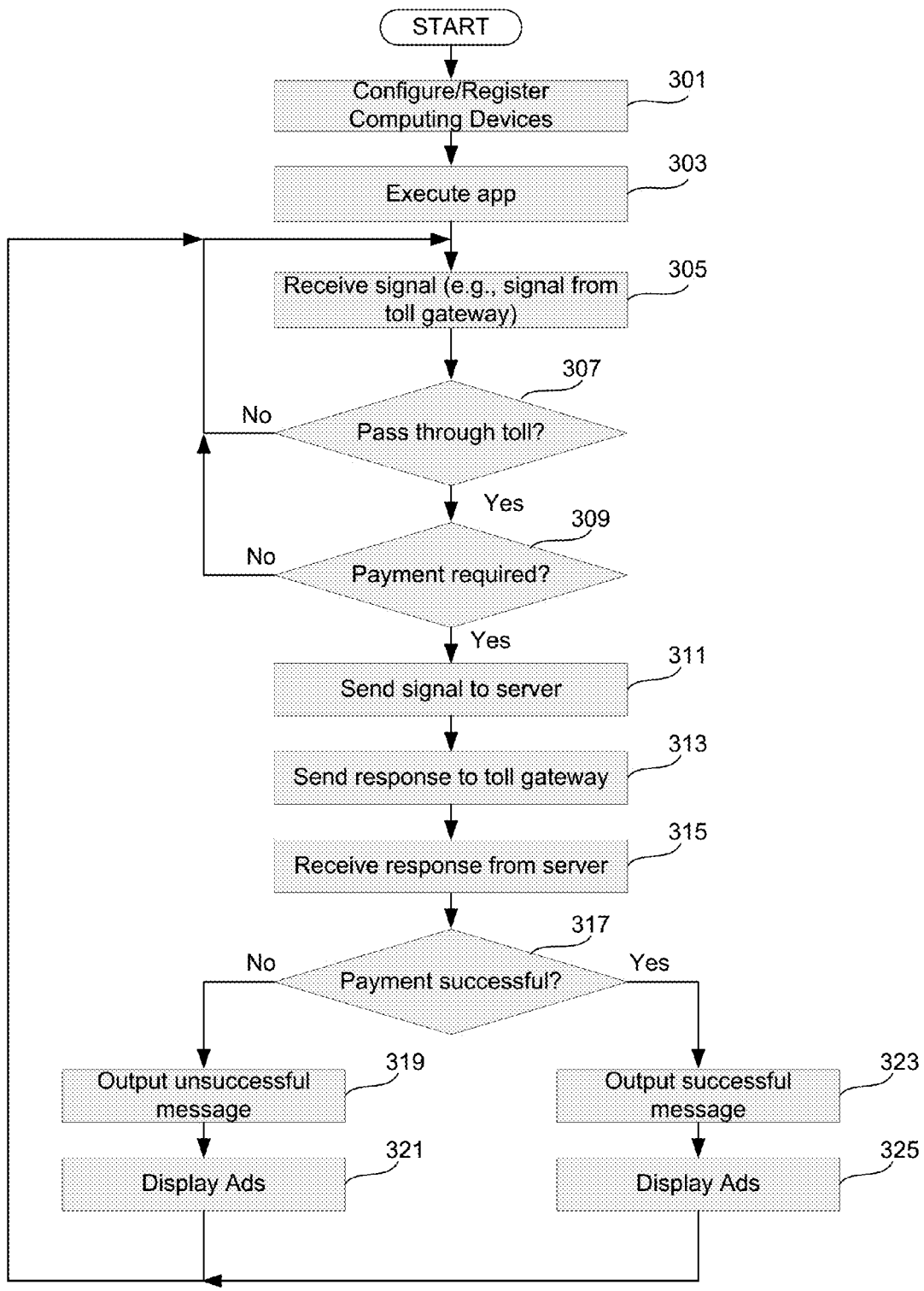
FIGS. 3-6 illustrate flow diagrams of example processes in accordance with aspects of the present disclosure.

FIG. 3 illustrates a flow diagram for an example method in accordance with aspects of the present disclosure. More specifically, FIG. 3 illustrates a plurality of steps of a method for making a toll payment. The steps of FIG. 3 may be performed by various devices disclosed herein, and in particular a mobile computing device 100m, such as a cell phone of a driver or passenger of the vehicle 202. One or more of the steps of FIG. 3 may be performed by executing a client-side toll equipment program and/or operating a particularly configured computing device 100 of the toll payment system. As a result of the method of FIG. 3, a person may use his/her phone (e.g., cell phone) to pay a toll.

The method of FIG. 3 may begin with a step 301 of configuring and/or registering the computing devices of the toll payment system. For example, configuring a mobile computing device 100m of a customer of an insurance company may include downloading and installing a toll equipment program. Different mobile computing devices 100*m* may install different versions of the toll equipment program depending on a platform of the mobile computing device 100*m*. For example, a mobile computing device running the iOS™ operating system may download a different version of the toll equipment program than a device running the ANDROID™ operating system.

In some embodiments, step 301 may also include registering a computing device with the organization operating/managing the toll gateway 203 and/or an insurance company. Registering a computing device may include creating and/or logging into an account with an associated username and/or password. The account may be associated with the mobile computing device 100*m* and/or an insurance policy of a user of the mobile computing device 100*m*. To perform registration, the organization providing the insurance company may request various information, including information regarding a user device (e.g., device identifier, device make, device model, etc.), information regarding a user (e.g., name, birthdate, address, insurance policy number, etc.), and/or information regarding a vehicle (e.g., make, model, year, vehicle identification number (VIN), etc.). Registration may also include setting up an account for billing purposes. For example, registration may include establishing an account with the insurance company from which toll payments are deducted. Establishing this account may include depositing money into the account. Additionally, establishing this account may include linking the account with a user's banking account (e.g., checking or savings account) so that funds may be replenished automatically to cover toll payments.

In some embodiments, when registering with the toll payment system, a user may create a profile. The profile may include certain user preferences so that a customized experience may be realized. For example, a user may create settings that define whether they will receive advertisements, which advertisements they will receive, when they will receive advertisements, and/or how many advertisements they will receive. A user may also create settings that define which mobile computing device 100*m* will be responsible for triggering toll payments when multiple mobile computing devices 100*m* are within a vehicle 202 at the time of passing through the toll gateway 203.

In some embodiments, step 301 may also include performing a test. For example, the mobile computing device 100*m* may send a test signal to the insurance company computing devices 205 to trigger the insurance company computing devices 205 to make a toll payment. The insurance company computing devices 205 may then transfer a small amount (e.g., one cent) to the toll management computing devices 204. Next, the insurance company computing devices 205 or toll management computing devices 204 may send a test result notification to the mobile computing device 100*m* indicating whether the test was successful (e.g., whether toll payment is working properly). This test may help to give users confidence that their phones will work properly to make toll payments and that they will not receive a ticket for non-payment of a toll.

In step 303, the toll equipment program installed on the mobile computing device 100*m* may be executed. Where the toll equipment program is an "app" on a smartphone, step 303 may include a user selecting the "app" and the operating system of the smartphone running the "app." This client-side toll equipment program may be continuously run in the background of the mobile computing device 100*m* so that it is configured to assist in making toll payments whenever a user happens to pass through a toll gateway 203. In other words, the toll equipment program may run in the background continuously so that users do not have to interact with the program each time they are about to pass through a toll gateway 203. Because the client-side toll equipment program may run in the background it might not be distracting to users wishing to perform other operations with their mobile computing devices 100*m*, and therefore, users may be more likely to adopt the client-side toll equipment program. In some embodiments, once launched, the client-side toll equipment program may be launched automatically each time the mobile computing device 100*m* is powered on. Thus, if the mobile computing device 100*m* is turned off or its battery dies, the client-side toll equipment program may be automatically launched again when the mobile computing device 100*m* is turned back on or powered back up.

In some embodiments, the client-side toll equipment program may enter a sleep mode so as not to drain the battery of the mobile computing device 100*m* when it is unlikely to pass through a toll gateway. Whether the client-side toll equipment program is in a sleep mode or not may be based on acceleration data obtained from the accelerometer (or gyroscope) or GPS receiver of the mobile computing device 100*m*. For example, if the client-side toll equipment program determines that its host phone has not exceeded a certain speed in a while (e.g., has not exceeded 20 mph in the last 15 minutes), it may assume that it is not in a vehicle 202 and therefore not likely to pass through a toll gateway 203.

At step 305, the mobile computing device 100*m* (e.g., a cell phone, smartphone, etc.) may receive a signal from the toll gateway 203. For example, the mobile computing device 100*m* may receive a beacon signal transmitted by one or more of the toll gateway transceivers 210 illustrated in FIG. 2. The beacon signal may include information, such as an identifier of the toll gateway 203, an amount of a toll owed, and/or a time and/or date that the mobile computing device 100*m* passed through the toll gateway 203. In some embodiments, the beacon signal may also include additional information. For example, this additional information may include a speed of the vehicle 202 passing through the toll gateway 203, which may be detected using radar equipment of the toll gateway 203. Also, for example, the additional information may include a tailgating distance, which may indicate a distance that the vehicle 202 passing through the gateway was from the previous vehicle that passed through the toll gateway 203.

At step 307, the mobile computing device 100*m* may determine whether it (and therefore a vehicle 202 carrying it) has passed through a toll gateway 203. The mobile computing device 100*m* may analyze the signal received in step 305 to make this determination. The mobile computing device 100*m* may receive various signals for various purposes, such as push notifications for various apps running on the mobile computing device 100*m*, cell signals for conducting phone calls with the mobile computing device 100*m*, and text messages. The mobile computing device 100*m* may be configured to distinguish a beacon signal from a toll gateway 203 from these other types of signals to determine when the mobile computing device 100*m* passes through a toll gateway 203. The client-side toll equipment program executing on the mobile computing device 100*m* may monitor all signals and determine which ones are beacon signals from a toll gateway 203. If the mobile computing device 100*m* determines, for example, that a received signal does not correspond to a beacon signal (No at step 307), the process may wait until the next signal is received at step 305 again.

If the mobile computing device 100m determines that it has passed through a toll gateway at step 307 (Yes at step 307), the process may advance to step 309. In step 309, the mobile computing device 100m determines whether a toll payment is required. In some embodiments, tolls may depend on a distance traveled. Therefore, there may be toll gateways 203 set up to determine when a vehicle first enters a toll road. These toll gateways 203 might not charge a toll at the time of entrance, but rather, may be used to detect where a vehicle has entered the toll road so that when the vehicle exits the toll road the appropriate amount owed based on the distance traveled can be determined. Accordingly, a toll might not be due each time a vehicle passes through a toll gateway 203. Therefore, the mobile computing device 100m may determine whether a toll payment is required at step 309. This determination may be made using the toll equipment program. In some embodiments, if a toll payment is not required, the mobile computing device 100m may store information indicating that a toll gateway 203 has been passed so that when another toll gateway 203 is passed, the mobile computing device 100m may determine the distance traveled and the appropriate amount owed or may send the information for the two toll gateways 203 to the insurance company computing devices 205 for determining the amount owed.

If a toll payment is required (Yes at step 309), the mobile computing device 100m may transmit a signal to an insurance company computing device 205 (e.g., a server) at step 311. The signal may be a cell signal or other signal and may include information obtained from the toll gateway (e.g., an identifier of the toll gateway 203) and/or additional information generated by the mobile computing device 100m. Such additional information may include one or more identifiers (e.g., of the mobile computing device 100m, the user of the mobile computing device 100m, or the vehicle 202 carrying the mobile computing device 100m), a location of the mobile computing device (e.g., GPS coordinates), and a time that the mobile computing device 100m passed through the toll gateway 203. Additionally, or alternatively, the additional information may include driving behavior information, such as a speed of the vehicle as it passes through the toll gateway 203 (which may be obtained from the vehicle computing device 100v, the OBD device 207, the mobile computing device 100m itself based on GPS coordinates or accelerometer data).

In some cases, the mobile computing device 100m sending the signal at step 311 might not be the only mobile computing device 100m within the vehicle 202. To prevent multiple mobile computing devices 100m within the same vehicle 202 from sending a signal and causing multiple toll payments to be made for a single vehicle 202, the mobile computing devices 100m within the same vehicle may communicate with one another to determine which one is responsible for transmitting the signal at step 311. This determination of which mobile computing device is the dominant (or responsible) mobile computing device 100m will be further described below with respect to FIG. 6.

In step 313, the mobile computing device 100m may send a signal back to the toll gateway 203. For example, the mobile computing device 100m may send a response signal to the toll gateway transceivers 210 or toll gateway computing device 209. The signal sent at step 313 may be any type of wireless signal sent using any protocol. For example, the response signal may be sent using the IEEE 802.11 protocol. A cellular signal may also be used as the response signal at step 313; however, it is anticipated that the response signal will be sent while the vehicle 202 is still in the vicinity of the toll gateway 203, and therefore, a local wireless network connection between the mobile computing device 100m and toll gateway 203 may be possible.

The response signal transmitted at step 313 may include information confirming that the mobile computing device 100m received the beacon signal as it passed through the toll gateway 203. The response signal may also indicate that the toll payment was made or will be made or that the toll payment system is otherwise working properly. In some embodiments, the response signal may also include additional information, such as the speed of the vehicle 202, an identifier of the vehicle 202, an identifier of the mobile computing device 100m, identifiers of other mobile computing devices 100m within the vehicle 202, etc.

In step 315, the mobile computing device 100m may receive a response to the signal it sent in step 311. The response may be received by the mobile computing device 100m from the toll management computing devices 204 or insurance company device 205. The response may include information indicating that the toll payment was successful. For example, the mobile computing device 100m may receive a signal from the insurance company computing device 205 indicating that the funds for the toll were transferred to the toll management computing device 204. Or, for example, the mobile computing device 100m may receive a signal from the insurance company computing device 205 indicating the toll payment was not made (e.g., because there were not enough funds in the customer's account with the insurance company).

In step 317, the mobile computing device 100m may determine whether the funds were transferred successfully. This determination may be made based on the signal received at step 315.

If the mobile computing device 100m determines that the funds were not transferred successfully (No at step 317), the mobile computing device 100m may output a message indicating that the toll payment was unsuccessful at step 319. Outputting this message may include playing an audible tone (e.g., a beeping sound) or audible message (e.g., a voice recording stating "the toll payment failed"). Additionally, or alternatively, the message may include text and/or an image displayed on a screen of the mobile computing device 100m. Moreover, the message may be communicated by causing the mobile computing device 100m to vibrate.

In step 321, advertisements may be played (e.g., displayed) on the mobile computing device 100m. As a result of the failure to pay the toll, the insurance company may cover the toll payment on behalf of the customer and provide the customer with advertisements to offset the cost of covering the customer. The number or type of advertisements displayed may depend on the customer, the amount of the toll that was due or underpaid, how many tolls the customer has failed to pay in the past, etc.

In some embodiments, the advertisements may be presented automatically shortly after being received. In other embodiments, the advertisements may be stored locally by the mobile computing device 100m for later presentation to the user (e.g., after the user finishes driving). In some examples, the mobile computing device 100m may detect when a drive is finished and automatically present the advertisements at that time.

Still, in some embodiments, the user may have the option of viewing the advertisements. If the user views the advertisements, the user might avoid getting a ticket for going through the toll without enough funds to pay for the toll. If the user chooses not to view the advertisements, the user may have to pay the toll and/or a penalty for not having enough funds to pay the toll initially.

Returning to step 317, if the mobile computing device 100*m* determines that the funds were transferred successfully (Yes at step 317), the mobile computing device 100*m* may output a message indicating that the toll payment was successful at step 323. Outputting this successful message may include playing an audible tone (e.g., a beeping sound) or audible message (e.g., a voice recording stating "the toll was paid"). Additionally, or alternatively, the message may include text and/or an image displayed on a screen of the mobile computing device 100*m*. Moreover, the message may be communicated by causing the mobile computing device 100*m* to vibrate. The message at step 323 may be different from the message at step 319 so that users (e.g., drivers) may easily discern whether the toll payment was successful or not.

In step 325, advertisements may be played (e.g., displayed) on the mobile computing device 100*m*. In some embodiments, users may agree to view advertisements in exchange for a discount on the toll payment. Therefore, even in cases where some funds are transferred, advertisements may be presented to a user. The number or type of advertisements presented at step 325 may depend on the customer, the amount of the discount, the time that the customer went through the toll, etc. In some examples, the number of advertisements presented in step 325 may be less than the number of advertisements that would have been presented had the toll payment failed.

In some embodiments, the advertisements may automatically be presented at step 325 shortly after being received. In other embodiments, the advertisements to be presented at step 325 may be stored locally by the mobile computing device 100*m* for later presentation to the user (e.g., after the user finishes driving). In some examples, the mobile computing device 100*m* may detect when a drive is finished and automatically present the advertisements at that time.

Still, in some embodiments, the user may have the option of viewing the advertisements. If the user views the advertisements, the user may be refunded a portion of the toll or the previous discount may be validated. If the user chooses not to view the advertisements, the user may have to pay the undiscounted toll amount.

In some embodiments, where advertisements are used, the mobile computing device 100*m* may determine whether advertisements have been viewed. A user/customer may not receive the benefits of the advertisements if the advertisements are not viewed. For example, if the advertisement displayed in step 321 or step 325 is a video, the mobile computing device 100*m* may determine whether the video has been completely played before relieving the customer from having to pay the ticket or before rewarding the customer with the discount. After steps 321 and 325 are complete (assuming advertisements are presented), the process may return to step 305 at which the mobile computing device 100*m* may receive another signal for another toll gateway 203 that it passes through.

Figure 4:
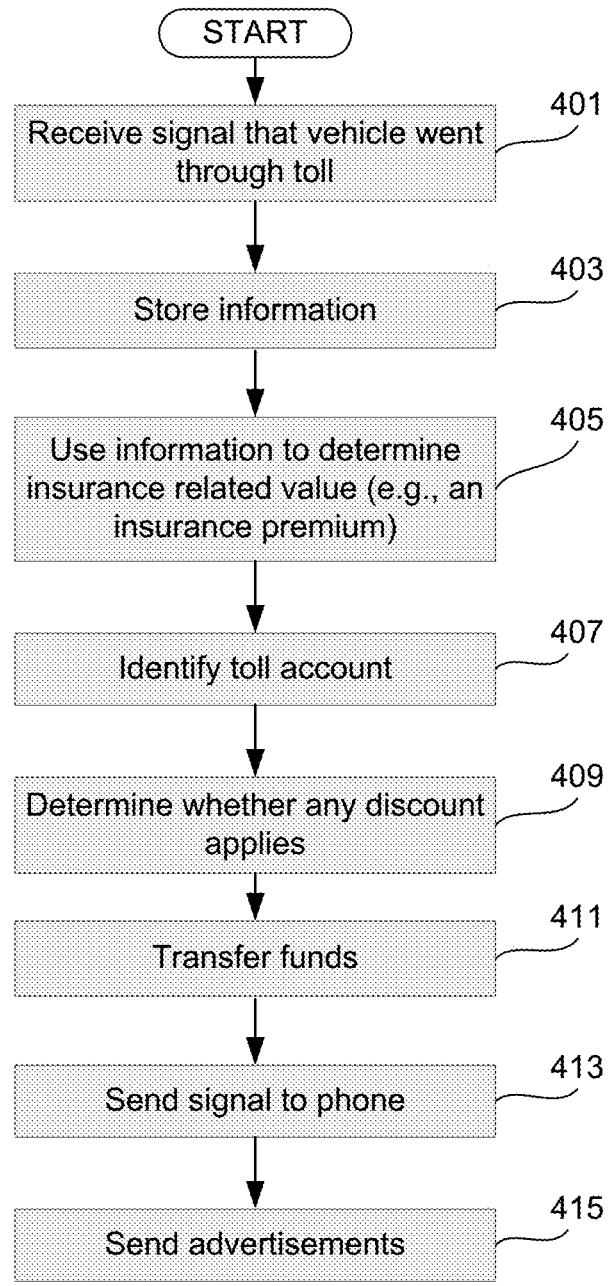

FIG. 4 illustrates a flow diagram for another example method in accordance with aspects of the present disclosure. More specifically, FIG. 4 illustrates a plurality of steps of a method for making a toll payment. The steps of FIG. 4 may be performed by various devices disclosed herein, and in particular one or more of the insurance company computing devices 205 (e.g., a server of an insurance company). One or more of the steps of FIG. 4 may be performed by executing a server-side toll equipment program and/or operating a particularly configured computing device 100 of the toll payment system. As a result of the method of FIG. 4, a server of an insurance company may handle payment of a toll for a customer (e.g., a person with an insurance policy with the insurance company).

The method of FIG. 4 may begin with a step 401 in which one or more of the insurance company computing devices 205 may receive a signal from a mobile computing device 100*m* or toll gateway 203 indicating that a specific mobile computing device 100*m* passed through a toll gateway 203. The signal received in step 401 may include information including an identifier of the mobile computing device 100*m* that was detected, an identifier of a vehicle 202 in which the mobile computing device 100*m* was located when it passed through the toll gateway 203, a speed of the mobile computing device 100*m* as it passed through the toll gateway 203, an identifier or location of the toll gateway 203 that the mobile computing device 100*m* passed through, a time at which the mobile computing device 100*m* passed through the toll gateway 203, a distance between two consecutive vehicles passing through the toll gateway 203 (e.g., tailgating information), etc. In some embodiments, the signal received in step 401 may correspond to the signal transmitted by the mobile computing device 100*m* at step 311.

In some embodiments, the signal received in step 401 may indicate the amount owed for the toll. In other embodiments, the signal received in step 401 might not include the amount owed for the toll. In such embodiments, one or more of the insurance company computing devices 205 may determine the amount of the toll due at step 401. This determination may be based on time/date information, location information (e.g., GPS coordinates), vehicle information (e.g., number of axles of a vehicle in which the mobile computing device is travelling, which may be entered based on user responses to a prompt, based on insurance policy information, or based on user entered settings), and/or a toll gateway identifier included with the signal received at step 401.

In some embodiments, where multiple mobile computing devices 100*m* are located in the same vehicle 202 and one or more of them are configured to make toll payments (e.g., are executing a client-side toll equipment program), the insurance company computing device 205 may receive multiple signals at step 401. The insurance company computing device 205 may determine that the signals are from mobile computing devices 100*m* within the same vehicle 202 based on information in the signals, such as a toll identifier, time of passing through the toll gateway (e.g., time a signal from the toll gateway is received by the mobile computing devices 100*m*), vehicle information, etc. After determining that multiple signals have been received for the same vehicle 202, the insurance company computing device 205 may select one account to be charged the fee for the toll. The selection may be based on user preferences, insurance related information (e.g., which insurance policy each user has or what insurance premium a user pays), information indicating whether a user is eligible for a discount, past toll payment information (e.g., users that have paid less in the past may be selected to pay the current toll due), etc. or the selection may be random. In this manner, the insurance company computing device 205 may prevent a vehicle 202 from being over charged for passing through a single toll gateway 203.

Step 403 may include storing the information received in step 401. The information may be stored in a database owned or maintained by an insurance company or on behalf of the insurance company. The information may be stored in association with other information stored by the insurance company, such as insurance policy information. For example, the insurance company computing device 205 may identify a policy holder based on an identifier (e.g., telephone number) of the mobile computing device 100m that passed through the toll gateway 203. The insurance company computing device 205 may then store the information received in step 401 with other information of the policy holder (e.g., other information on the policy holder's driving behavior).

In step 405, one or more of the insurance company computing devices 205 may use the information (or a part thereof) received in step 401 to determine an insurance related value (e.g., an insurance premium or deductible) for a policy holder identified in step 403. For example, an insurance company computing device 205 may use drive data, such as the tailgating information and/or speed information, to determine a drive score for a customer. The drive score for the customer may be used to gauge whether the customer is a safe driver and may be a factor in lowering the customer's insurance premium and/or deductible. On the other hand, an insurance company computing device 205 may use the tailgating information and/or speed information to determine that a customer is a risky driver so that the customer's insurance premium and/or deductible is not lowered in the future.

At step 407, one or more of the insurance company computing devices 205 may identify a toll account associated with the mobile computing device 100m that was detected passing through the toll gateway 203. The toll account may include the funds or keep a record of the funds available for a particular policy holder to use for payment of tolls. For example, the toll account may be similar to an online banking account, but may be used exclusively to make toll payments.

Step 409 may include determining whether any discount applies. In some cases, a customer may receive a discount on the toll payment for participating in the toll payment system. The amount of the discount may depend on the customer's insurance policy or a customer's status (which may be based on a customer's loyalty or the amount of business the customer gives the insurance company). For example, customers who insure multiple items (e.g., a house and multiple vehicles) with the insurance company may receive a greater discount than customers that insure only a single item with the insurance company. In some cases, the customer might only receive a discount in exchange for sharing information about the customer (e.g., who the customer is driving with when going through the toll gateway, when the customer goes through the toll gateway, a speed of the vehicle 202 as it passes through the toll gateway 203, tailgating information of the vehicle as it passes through the toll gateway 203, etc.). Or, in some cases, the customer may receive a discount if they agree to receive and/or view advertisements after they pass through toll gateways 203.

In some embodiments, insurance company customers may receive discounts on tolls if they agree to carpool. Information collected from the toll gateway 203 and/or mobile computing devices 100m when a vehicle 202 passes through the toll gateway may include information indicating which mobile computing devices 100m are within the vehicle 202 (which may be used to represent who is in the vehicle as people have been known to carry certain mobile computing devices 100m with them). This information may be used to determine whether customers are in fact carpooling, and therefore, whether customers are in fact eligible to receive discounts on tolls or other insurance related values (e.g., insurance premiums).

In step 411, one or more of the insurance company computing devices 205 may transfer funds for the toll payment from the toll account identified in step 407. The funds may be transferred to one of the toll management computing devices 204 or an account of the toll company. In some embodiments, the funds may be transferred along with information indicating the vehicle 202 that passed through the toll gateway 203, an identifier of the toll gateway 203, and/or a time of passing through the toll gateway. If there are not enough funds in the identified toll account, one or more of the insurance company computing devices 205 may send a signal to the toll gateway 203 (e.g., the toll gateway computing device 209) or one of the toll management computing devices 204 indicating the unsuccessful payment. This signal may include information identifying the vehicle 202 and/or vehicle owner or operator so that the toll company may issue a ticket. In some embodiments, this signal may trigger the camera 211 to take a photograph of a vehicle 202 passing through the toll gateway 203 or trigger the camera 211 or toll gateway computing device 209 to store a photograph already taken of the vehicle 202 that went through the toll gateway 203 without making the toll payment.

In step 413, one or more of the insurance company computing devices 205 may send a signal to the mobile computing device 100m. This signal may include information indicating whether the funds were transferred successfully. The signal transferred at step 413 may be similar to the signal received at step 315 in FIG. 3.

At step 415, one or more of the insurance company computing devices 205 may determine which advertisements, if any, to send to the mobile computing device 100m that went through the toll gateway 203. The advertisements may be determined based on user preferences or information stored in association with an insurance policy. Different advertisements may be provided to different mobile computing devices 100m of users depending on the insurance policy of the users. For example, a user with an insurance policy for a luxury vehicle may receive different advertisements than a user with an insurance policy for an economy vehicle.

Figure 5:
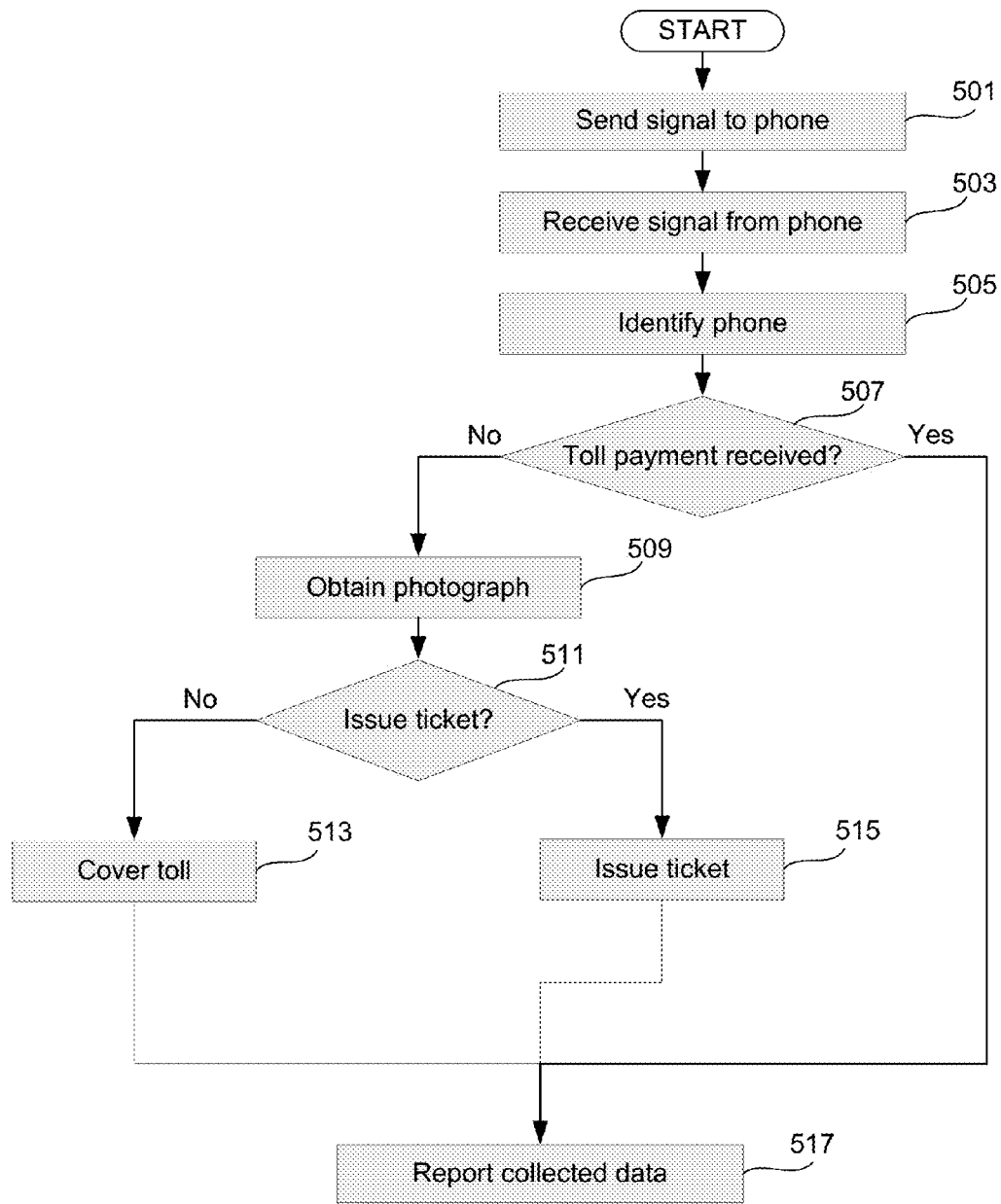

FIG. 5 illustrates a flow diagram for an example method in accordance with aspects of the present disclosure. More specifically, FIG. 5 illustrates a plurality of steps of a method for making a toll payment. The steps of FIG. 5 may be performed by various devices disclosed herein, and in particular one or more devices of the toll gateway (e.g., the toll gateway computing device 209). One or more of the steps of FIG. 3 may be performed by executing a gateway-side toll equipment program and/or operating a particularly configured computing device 100 of the toll payment system. As a result of the method of FIG. 5, a toll gateway 203 may allow a vehicle 202 to pass without issuing a ticket if phone in the vehicle is used to make a toll payment.

The method of FIG. 5 may begin with a step 501 in which beacon signal is transmitted. In step 503, the toll gateway 203 may receive a response signal from a mobile computing device 100m. After receiving the response signal, the toll gateway 203 may identify the mobile computing device 100m in step 505. At step 507, the toll gateway 203 may determine whether the toll payment was made for a vehicle 202 carrying the mobile computing device 100m. If the toll payment was not made, the toll gateway 203 may instruct the camera 211 to take a photograph of the vehicle 202 in step 509. If a photograph of the vehicle 202 was previously taken, then the photograph may be obtained in step 509. After obtaining the photograph, the toll gateway 203 may determine whether to issue a ticket or citation at step 511. If the vehicle 202 that passed through the toll gateway 203 without paying the toll belongs to a customer of the insurance company, a ticket might not be issued. For example, the insurance company may cover the toll for the customer at step 513 and add a fee to the customer's insurance premium for the next payment cycle (e.g., monthly payment). Step 513 may include searching a customer database of an insurance company. If the vehicle 202 does not belong to a customer of the insurance company (or if the vehicle 202 is not insured by the insurance company), the toll gateway may issue a ticket or citation in step 515. After steps 507, 513, and 515, the toll gateway 203 may report collected data to one or more of the insurance computing devices 205 in step 517. For example, the toll gateway 203 may send information, such as speed data or tailgating data of a vehicle 202 going through the toll gateway, to the insurance company. The insurance company may use this information in evaluating the risk of customers and potential customers in order to determine insurance rates (e.g., insurance premiums). At step 517, the toll gateway 203 may also send, to the insurance company, information indicating a time and location of the payment and information indicating other mobile computing devices 100 within the vehicle 202.

Figure 6:
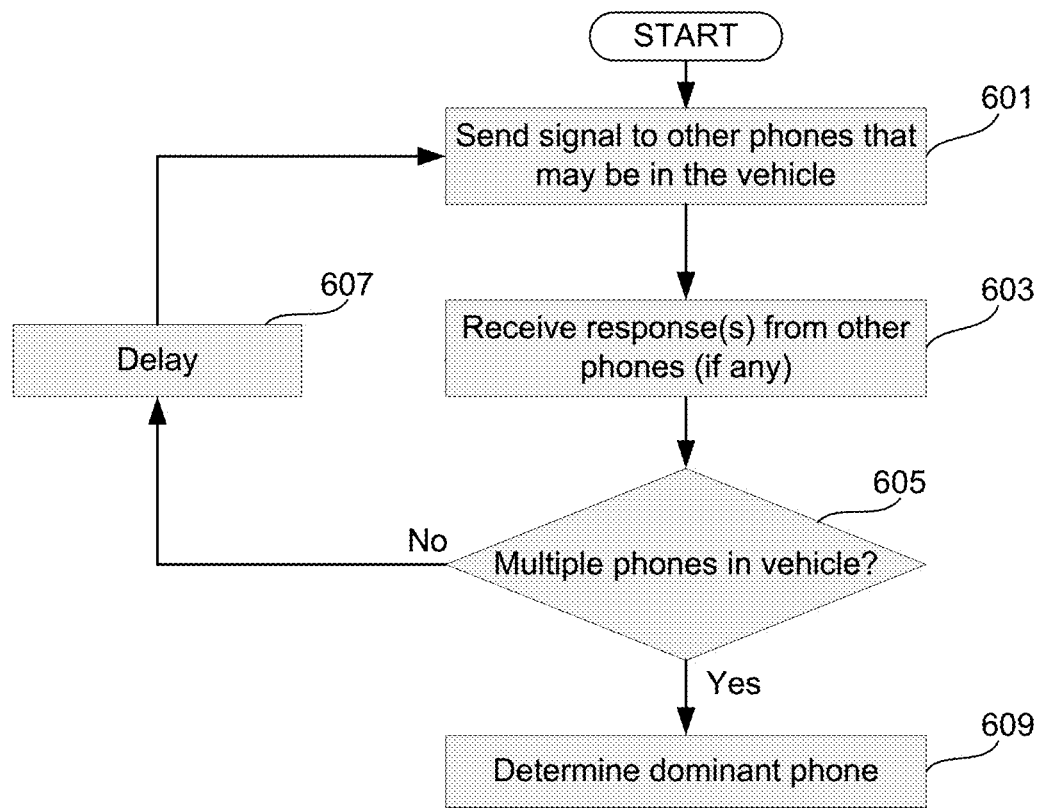

FIG. 6 illustrates a flow diagram for an example method in accordance with aspects of the present disclosure. More specifically, FIG. 6 illustrates a plurality of steps of a method for determining which of a plurality of mobile computing devices 100*m* within a vehicle 202 is responsible for handling a toll payment. The steps of FIG. 6 may be performed by various devices disclosed herein, and in particular mobile computing devices 100*m*, such as cell phones within the vehicle 202. One or more of the steps of FIG. 6 may be performed by executing a client-side toll equipment program and/or operating a particularly configured computing device 100 of the toll payment system. As a result of the method of FIG. 6, the phones in a vehicle 202 may discover one another and select a dominant phone to take responsibility for paying a toll.

The method of FIG. 6 may begin with a step 601 in which one or more mobile computing devices 100*m* within a vehicle 202 send a signal to discover the other mobile computing devices 100*m* within the vehicle 202. For example, a first phone in the vehicle 202 may transmit (or broadcast) a signal that may be picked up by a second phone in the vehicle 202. This transmitted signal may be sent using a local wireless protocol, such as ZigBee or Bluetooth.

In step 603, the mobile computing device 100*m* that transmitted the signal in step 601 may receive a response signal from another mobile computing device 100*m* within the vehicle (assuming there is one).

In step 605, the mobile computing device 100*m* that transmitted the signal in step 601 may determine whether there is another mobile computing device 100*m* within the same vehicle 202. If a set amount of time has passed since the signal was transmitted in step 601 and no response is received, the mobile computing device 100*m* may determine that there is no other mobile computing device 100*m* within the vehicle 202. If a response signal is received at step 603, the mobile computing device 100*m* may determine whether the response signal is from another mobile computing device 100*m* within the vehicle 202 that is configured to make toll payments (e.g., is running a client-side toll equipment program).

If no other mobile computing device 100*m* configured to make toll payments is detected (No at step 605), the mobile computing device 100*m* performing step 601 may undergo a delay at step 607. For example, the mobile computing device 100*m* that performed step 601 may wait for a predetermined time before performing step 601 again.

On the other hand, if it is determined that another mobile computing device 100*m* is in the vehicle 202 and configured to make toll payments, the mobile computing devices 100*m* may determine which mobile computing device 100*m* should take responsibility for making toll payments (e.g., should be the dominant mobile computing device 100*m*) at step 609. This determination may include exchanging communications between the mobile computing devices 100*m* to determine user preferences associated with each of the mobile computing devices 100*m*. For example, a mother's phone may communicate with a daughter's phone to determine the mother-daughter relationship and select the mother's phone to be the dominant phone. Users may set an order for this determination within the settings of a client-side toll equipment program. For example, a mother may control settings so that her husband's phone should be used instead of her phone to make toll payments, but her phone should be used instead of her son's phone and daughter's phone. If settings do not dictate which phone is to be the dominant phone, one of the phones may be randomly selected as the dominant phone.

Additionally, or alternatively, the determination of which mobile computing device 100*m* is to be the dominant mobile computing device 100*m* may be based on a location of the mobile computing devices 100*m* within the vehicle 202. The location of the mobile computing devices 100*m* within the vehicle may be determined based on GPS coordinates or communications with the vehicle computing device or an OBD device 207. For example, a phone that is closest to an OBD device 207 connected to the OBD II port in the vehicle 202 (which is typically on the driver's side below the steering wheel) may be set as the dominant phone in step 609. Step 609 may also include informing each of the discovered mobile computing devices 100*m* whether or not they are the dominant mobile computing device 100*m*. For example, the mother's phone may inform the son's phone that his phone is not the dominant phone.

Figure 7:
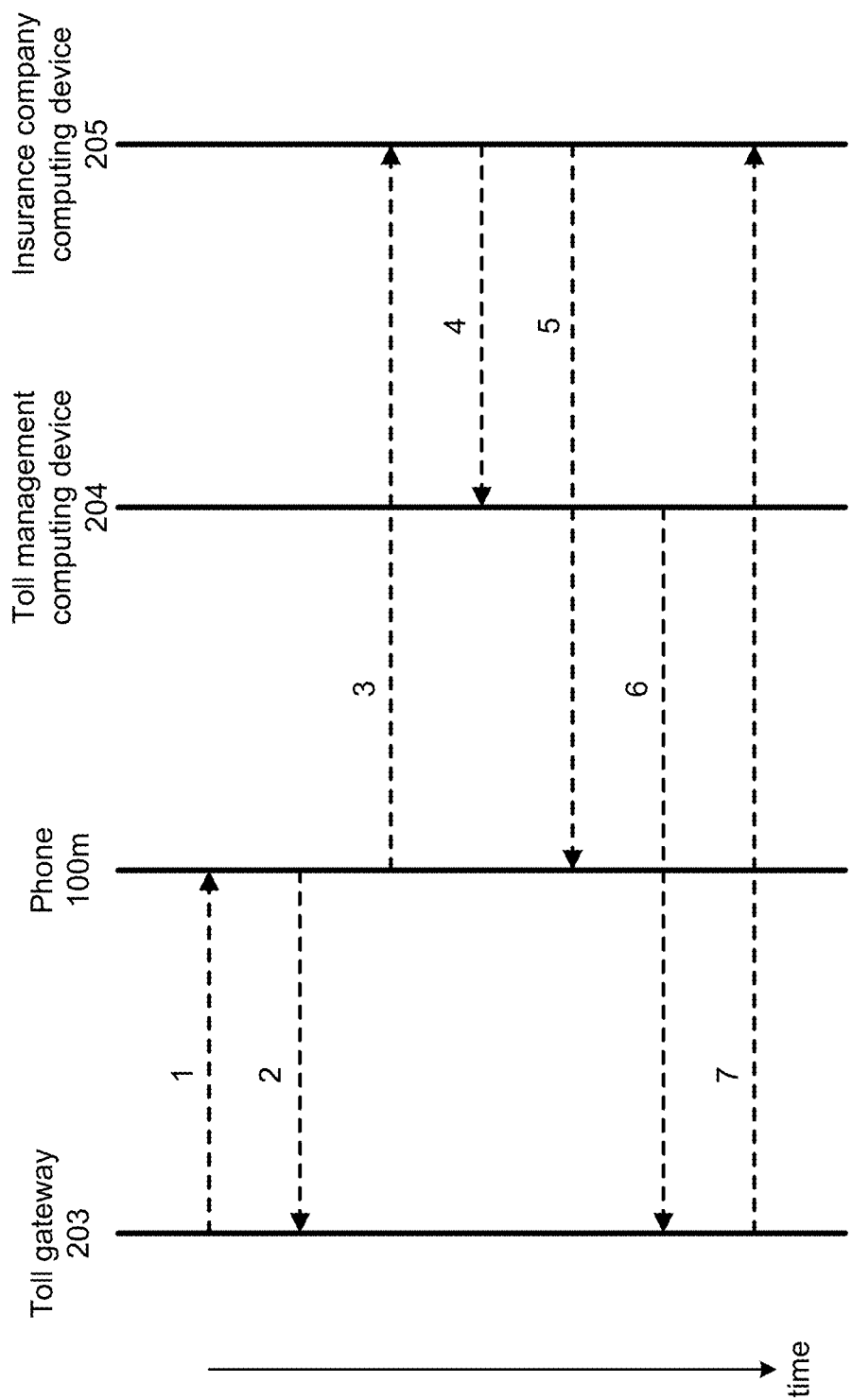
FIG. 7 illustrates a diagram of an example sequence of signals in accordance with aspects of the present disclosure

FIG. 7 provides a diagram illustrating an example sequence of signals in accordance with aspects of the present disclosure. The sequence of signals may begin when signal 1 is transmitted. As shown in FIG. 7, signal 1 may be transmitted from a toll gateway 203 to a mobile computing device 100*m* (e.g., a phone). Signal 1 may be transmitted in response to detecting an approaching vehicle. Or, the toll gateway 203 may be configured to transmit the signal 1 regardless of whether a vehicle is approaching. For example, the signal 1 may be transmitted continuously or intermittently (e.g., at periodic intervals). The signal 1 may be a beacon signal intended for receipt by a phone traveling in a vehicle 202 passing through the toll gateway 203.

In response to the signal 1, the phone may send a signal 2 back to the toll gateway 203. Signal 2 may indicate that the phone is passing through the toll gateway 203. Signal 2 may indicate that the phone has received signal 1 and will handle paying the toll. Signal 2 may include an identifier identifying the phone or vehicle.

In response to the signal 1, the phone may also send a signal 3 to the insurance company computing device 205. Signal 3 may include information identifying the toll gateway 203 and/or a location of the phone.

In response to signal 3, the insurance company computing device 205 may send a signal 4 to transfer funds to the toll management computing device 204. The amount of the funds transferred may be equal to the toll required or may be less if any discount is applicable.

In response to signal 3, the insurance company computing device 205 may send a signal 5 to inform the phone that the toll payment was made. Signal 5 may cause the phone to alert the driver that the toll payment was made (e.g., to play an audible tone).

In response to signal 4, the toll management computing device 204 may send signal 6 to inform the toll gateway 203 that funds were received to pay the toll for the vehicle that was carrying the phone that sent signal 2. Signal 6 may include an identifier indicating a phone and/or vehicle that passed through the toll gateway 203 and/or a time that the vehicle/phone passed through the toll gateway 203.

In response to signal 6 or signal 2, the toll gateway 203 may send signal 7 to provide the insurance company computing device 205 with driving information collected for the vehicle 202 that passed through the toll gateway 203. This driving information may include a speed of the vehicle as it passed through the toll gateway 203 and/or whether the vehicle was tailgating another vehicle or being tailgated. In some embodiments, the distance of the tailgating may be included in signal 7.

It should be understood that the signals in FIG. 7 may each include one or more signals. For example, signal 7 may include one signal to send speed information and another signal to send tailgating information. Also, each signal may include one or more packets (e.g., IPv4 or IPv6 packets) of data. Further, the order of the signals may be different in other embodiments. For example, signal 3 may be sent before signal 2. Also, signals are described as being in response to other signals, however, other events or signals may trigger the transfer of the signals. For example, signal 6 may be sent in response to a request from the toll gateway 203 to the toll management computing device 204 for information indicating whether a toll has been paid for a particular the vehicle 202.

Figure 8:
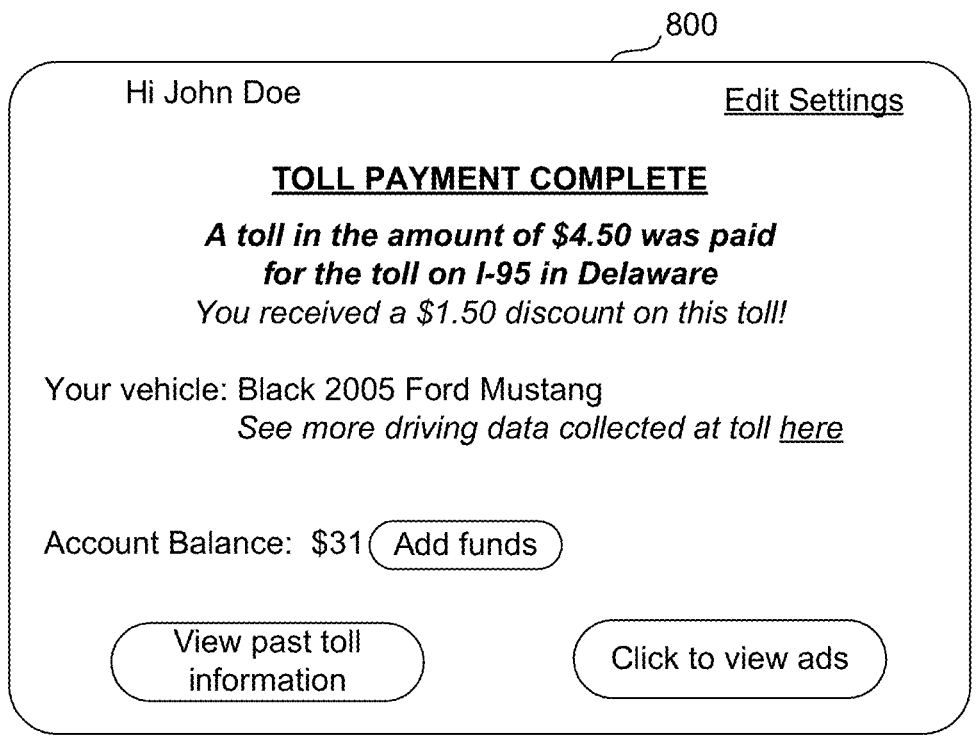
FIG. 8 illustrates a diagram of an example interface presented by computing devices configured according to aspects of the present disclosure.

FIG. 8 illustrates an example interface 800 in accordance with aspects of the present disclosure. This interface may be displayed on a screen of a mobile computing device 100*m* (e.g., a smartphone) after it has passed through a toll gateway. In some embodiments, the interface of FIG. 8 may be displayed on a screen of a mobile computing device 100*m* soon after (e.g., within 5 minutes) the mobile computing device 100*m* passes through a toll gateway 203. It should be understood that the user interface 800 of FIG. 8 is intended to illustrate various features and aspects of the toll payment system, and that interfaces are not limited to the visual appearance or layout depicted in FIG. 8.

As shown in FIG. 8, the interface 800 may include a message to a user (e.g., driver or passenger) of the mobile computing device 100*m* indicating that a toll payment was successfully completed (e.g., funds were transferred). The message may include the amount paid and a description of the toll (e.g., an indicator of the toll road). The message may also indicate whether any discounts were applied. Further, interface 800 may display information about the vehicle 202 that the mobile computing device 100*m* is traveling in when it passed through the toll. The interface 800 may also include a link to other driving data collected at the toll gateway 203, such as speed data and tailgating data.

Interface 800 may also indicate an account balance of the toll account from which funds are transferred to make toll payments. This may allow a user to readily view their account balance and add funds if necessary or desired. Interface 800 may also include options for viewing past toll information, such as what other tolls the user has passed through and how much money a user has spent on tolls. In addition, the interface 800 may include an option for users to view advertisements. As explained above, users may receive advertisements in exchange for reduced toll rates or failing to pay tolls.

The interface 800 may also include an option to change settings. For example, the user may change settings used to determine which mobile computing device 100*m* is to be the dominant mobile computing device 100*m* when multiple mobile computing devices 100*m* are within the same vehicle.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps shown in the illustrative figures may be performed in other than the recited order, and that one or more steps illustrated may be optional in accordance with aspects of the invention. For example, referring to FIG. 5, the order of steps 501 and 503 may be swapped so that the mobile computing device 100*m* transmits a signal to the toll gateway 203 first and receives a response from the toll gateway 203.

What is claimed is:

1. A system, comprising:
   a first computing device associated with a first user, wherein the first computing device is configured to send and receive cellular phone calls;
   a toll gateway comprising a camera, wherein the toll gateway is configured to:
   operate the camera to capture one or more images of a first vehicle and a second vehicle passing through the toll gateway ahead of the first vehicle;
   analyze the one or more images to determine tailgating information indicating that the first vehicle is tailgating the second vehicle;
   communicate with the first computing device while the first computing device is located within the first vehicle; and
   one or more insurance company computing devices configured to:
   receive, from the first computing device or the toll gateway, a signal indicating that the first computing device passed through the toll gateway;
   determine whether the first user has agreed to share the tailgating information;
   in response to determining that the first user has agreed to share the tailgating information, determine that the first user qualifies for a discount on a toll owed by the first user for passing through the toll gateway;
   electronically transfer funds, based on the discount, from an account associated with the first computing device;
   receive, from the first computing device or the toll gateway, the tailgating information; and
   determine an insurance related value based on the tailgating information.

2. The system of claim 1,
   wherein the first computing device comprises a cell phone and is further configured to collect drive data from a global positioning system (GPS) receiver of the first computing device or from an accelerometer of the first computing device, wherein the first computing device is configured to transmit the drive data to the one or more insurance company computing devices, and
wherein the one or more insurance company computing devices are configured to determine the insurance related value further based on the drive data.

3. The system of claim 1,
wherein the toll gateway is configured to transmit a beacon signal to detect the first computing device, and
wherein the first computing device is configured to receive the beacon signal and transmit a response signal to the toll gateway in response to receiving the beacon signal.

4. The system of claim 3, wherein the first computing device executes a program that runs in a background of the first computing device to detect the beacon signal and that enters a sleep mode in response to determining, based on acceleration data, that the first computing device has not exceeded a predetermined speed for a predetermined amount of time.

5. The system of claim 1, wherein the first computing device is further configured to:
determine whether the toll is owed; and
in response to determining that the toll is owed, transmit, to at least one of the one or more insurance company computing devices, information identifying the first computing device and information identifying the toll gateway that the first vehicle passed.

6. The system of claim 1, wherein the first computing device is further configured to transmit, to the toll gateway, a signal indicating that a toll payment was made or will be made.

7. The system of claim 1, wherein the first computing device is further configured to provide a user with a message indicating that a toll payment was successfully completed and indicating that the discount was applied.

8. The system of claim 1,
wherein the one or more insurance company computing devices are further configured to:
determine whether a toll payment is successful;
select one or more advertisements based on whether the toll payment is successful; and
transmit the one or more advertisements to the first computing device.

9. The system of claim 1, wherein the one or more insurance company computing devices are further configured to:
determine an amount of the toll;
identify the account associated with the first computing device;
determine whether the funds are sufficient to cover the toll; and
in response to determining that the funds are insufficient to cover the toll, transmit one or more advertisements to the first computing device.

10. The system of claim 9, wherein the one or more insurance company computing devices are further configured to:
determine, based on a difference between the amount of the toll and an amount of the funds, a number of the one or more advertisements to be transmitted to the first computing device.

11. The system of claim 1, wherein the insurance related value comprises at least one of an insurance premium, an insurance deductible, or a drive score used in determining the insurance premium or the insurance deductible.

12. A system, comprising:
a network interface configured to communicate, via a network, with a mobile computing device and a toll gateway, wherein the mobile computing device is configured for use in cellular phone calls and wherein the toll gateway comprises a camera and is configured to:
operate the camera to capture one or more images of a first vehicle and a second vehicle passing through the toll gateway ahead of the first vehicle;
analyze the one or more images to determine tailgating information indicating that the first vehicle is tailgating the second vehicle; and
detect the mobile computing device within the first vehicle; and
at least one processor configured to:
receive, from the mobile computing device or the toll gateway and via the network interface, a signal indicating that the mobile computing device passed through the toll gateway;
determine whether a user, associated with the mobile computing device, has agreed to share the tailgating information;
in response to determining that the user has agreed to share the tailgating information, determine that the user qualifies for a discount on a toll owed by the user for passing through the toll gateway;
electronically transfer funds from an account associated with the user, wherein an amount of the funds is based on the discount;
transmit, to an entity responsible for collecting the toll, an electronic payment for the toll;
receive, from the mobile computing device or the toll gateway and via the network interface, the tailgating information; and
determine an insurance related value based on the tailgating information.

13. The system of claim 12, wherein the at least one processor is further configured to:
determine whether the amount of the funds is less than the toll; and
in response to determining that the amount of the funds is less than the toll, transmit one or more advertisements to the mobile computing device.

14. A method, comprising
receiving, by an insurance company computing device from a mobile computing device via a cellular backhaul, a signal indicating that a vehicle carrying the mobile computing device has passed through a toll gateway;
after receiving the signal, determining an account associated with the mobile computing device;
determining whether a user of the mobile computing device has agreed to share tailgating information that is generated by the toll gateway based on an analysis of one or more images, captured using a camera of the toll gateway, of the vehicle as the vehicle passed through the toll gateway;
in response to determining that the user has agreed to share the tailgating information, determining that the user qualifies for a discount on a toll owed by the user for passing through the toll gateway;
transferring funds, based on the discount, from the account to pay the toll;
receiving, from the mobile computing device or the toll gateway, the tailgating information; and
determining an insurance related value based on the tailgating information.

15. The method of claim 14, further comprising sending, to the mobile computing device, a signal indicating that the toll was paid and that the discount was applied.

16. The method of claim 14, further comprising:
determining an amount of the toll;
determining whether the funds are sufficient to cover the toll; and
in response to determining that the funds are insufficient to cover the toll, determining, based on a difference between the amount of the toll and an amount of the funds, one or more advertisements; and
transmitting the one or more advertisements to the mobile computing device.

17. The method of claim 14, further comprising:
determining that the funds are insufficient to cover the toll;
in response to determining that the funds are insufficient, determining one or more advertisements; and
storing, in memory of the mobile computing device, the one or more advertisements; and
in response to determining that a drive is finished, automatically presenting the one or more advertisements.

18. The system of claim 1, wherein the one or more insurance company computing devices are configured to:
determine an advertisement based on a time that the first vehicle passed through the toll gateway; and
transmit, to the first computing device, the advertisement in exchange for applying a second discount to the toll.

19. The system of claim 1,
wherein the toll gateway is configured to:
determine that a second computing device, associated with a second user, is in the first vehicle when the first vehicle passed through the toll gateway; and
transmit information indicating that the second computing device and the first computing device were in the first vehicle as the first vehicle passed through the toll gateway, and
wherein the one or more insurance company computing devices are configured to:
determine, based on the information indicating that the second computing device and the first computing device were in the first vehicle as the first vehicle passed through the toll gateway, that the first user and second user were carpooling; and
based on determining that the first user and the second user were carpooling, apply a second discount to the toll.

20. The system of claim 1,
wherein the toll gateway is configured to:
determine that a second computing device, associated with a second user, is in the first vehicle when the first vehicle passed through the toll gateway; and
transmit a second signal indicating that the second computing device passed through the toll gateway, and
wherein the one or more insurance company computing devices are configured to:
after receiving the signal and the second signal, determine that the first computing device and the second computing device were both in the first vehicle as the first vehicle passed through the toll gateway; and
after determining that the first computing device and the second computing device were both in the first vehicle as the first vehicle passed through the toll gateway, select, based on a user preference, the account associated with the first computing device instead of a second account associated with the second computing device so the account and the second account are not both charged for the first vehicle passing through the toll gateway.

* * * * *